US012109553B2

(12) United States Patent
Boll et al.

(10) Patent No.: US 12,109,553 B2
(45) Date of Patent: Oct. 8, 2024

(54) CATALYST SYSTEM AND METHOD FOR THE CATALYTIC COMBUSTION OF AMMONIA TO FORM NITROGEN OXIDES IN A MEDIUM-PRESSURE SYSTEM

(71) Applicant: Heraeus Deutschland Gmbh & Co. KG, Hanau (DE)

(72) Inventors: Willi Boll, Hanau (DE); Dirk Maier, Hanau (DE)

(73) Assignee: Heraeus Deutschland Gmbh & Co KG, Hanau (DE)

( * ) Notice: Subject to any disclaimer, the term of this patent is extended or adjusted under 35 U.S.C. 154(b) by 394 days.

(21) Appl. No.: 17/309,893

(22) PCT Filed: Jan. 9, 2020

(86) PCT No.: PCT/EP2020/050377
§ 371 (c)(1),
(2) Date: Jun. 28, 2021

(87) PCT Pub. No.: WO2020/148144
PCT Pub. Date: Jul. 23, 2020

(65) Prior Publication Data
US 2022/0080396 A1 Mar. 17, 2022

(30) Foreign Application Priority Data
Jan. 14, 2019 (EP) .................................... 19151608

(51) Int. Cl.
*B01J 23/42* (2006.01)
*B01J 23/44* (2006.01)
(Continued)

(52) U.S. Cl.
CPC ............. *B01J 23/464* (2013.01); *B01J 35/58* (2024.01); *C01B 21/38* (2013.01); *C01B 21/265* (2013.01)

(58) Field of Classification Search
CPC ... B01J 23/42; B01J 35/06; B01J 23/44; B01J 35/58; C01B 21/38; C01B 21/265
See application file for complete search history.

(56) References Cited

U.S. PATENT DOCUMENTS 2,831,752 A * 4/1958 Luckey .................... B01J 23/40
423/376
3,660,024 A * 5/1972 Gillespie ................. C01B 21/26
423/403

(Continued)

FOREIGN PATENT DOCUMENTS

CN 101554585 A 10/2009
CN 201722148 U 1/2011
(Continued)

OTHER PUBLICATIONS

International Search Report issued in PCT/EP2020/050377 on Jan. 27, 2020.
(Continued)

*Primary Examiner* — Cam N. Nguyen
(74) *Attorney, Agent, or Firm* — Blank Rome LLP

(57) ABSTRACT

Known catalyst systems for the catalytic combustion of ammonia to form nitrogen oxides consist of a plurality of catalyst gauze layers which are knitted, woven or braided from platinum-based precious metal wire, which form a catalyst package when arranged after one another when viewed in a fresh gas flow direction. In order to provide a catalyst system on this basis for use in a medium-pressure system, with which a yield of the main product NO comparable to the industry standard can be achieved despite the reduced precious metal use, according to the invention, the catalyst package is formed from a front assembly with three catalyst gauzes with a first average mass per unit area and a downstream assembly of catalyst gauze layers arranged after the front assembly and having a second average mass per
(Continued)

unit area, wherein the average mass per unit area of the front assembly has a short weight in the region of 1.5% to 29% in relation to the second average mass per unit area, and the first average mass per unit area lies in the regions of 410 to 30 g/m² and the second average mass per unit area lies in the region of 540 to 790 g/m².

16 Claims, 2 Drawing Sheets

(51) Int. Cl.
    *B01J 23/46*     (2006.01)
    *B01J 35/06*     (2006.01)
    *B01J 35/58*     (2024.01)
    *C01B 21/26*     (2006.01)
    *C01B 21/38*     (2006.01)

(56) References Cited

U.S. PATENT DOCUMENTS

| | | | | |
|---|---|---|---|---|
| 4,375,426 A | * | 3/1983 | Knapton | B01J 35/06 |
| | | | | 502/325 |
| 4,469,666 A | * | 9/1984 | Stephenson | C01C 3/0216 |
| | | | | 422/651 |
| 4,869,891 A | * | 9/1989 | Handley | C01B 21/265 |
| | | | | 423/403 |
| 5,268,157 A | | 12/1993 | Blass et al. | |
| 5,401,483 A | * | 3/1995 | Ostroff | B01J 12/007 |
| | | | | 502/527.22 |
| 5,527,756 A | * | 6/1996 | Ostroff | B01J 35/58 |
| | | | | 502/527.22 |
| 5,656,567 A | * | 8/1997 | Heywood | C01B 21/267 |
| | | | | 502/313 |
| 6,073,467 A | | 6/2000 | Blass et al. | |
| 7,976,804 B2 | * | 7/2011 | Jantsch | B01J 23/464 |
| | | | | 422/177 |
| 9,056,307 B2 | * | 6/2015 | Keller | B01J 23/42 |
| 9,126,187 B2 | * | 9/2015 | Keller | B01J 23/42 |
| 9,340,424 B2 | * | 5/2016 | Coupland | C01B 21/265 |
| 2002/0127932 A1 | | 9/2002 | Neumann et al. | |
| 2003/0124046 A1 | | 7/2003 | Gorywoda et al. | |
| 2007/0031314 A1 | * | 2/2007 | Axon | C01C 3/0216 |
| | | | | 423/392 |
| 2009/0084090 A1 | | 4/2009 | Nakatsuji et al. | |
| 2014/0031201 A1 | | 1/2014 | Keller et al. | |
| 2014/0031202 A1 | | 1/2014 | Keller et al. | |
| 2022/0080396 A1 | * | 3/2022 | Boll | B01J 23/464 |
| 2022/0089439 A1 | * | 3/2022 | Boll | B01J 35/0073 |

FOREIGN PATENT DOCUMENTS

| | | |
|---|---|---|
| CN | 102935363 A | 2/2013 |
| DE | 2145842 A1 | 3/1973 |
| DE | 10105624 A1 | 10/2002 |
| DE | 60201502 T2 | 11/2005 |
| EP | 0504723 A1 | 9/1992 |
| EP | 2689841 A2 | 1/2014 |
| EP | 3056267 A1 | 8/2016 |
| RU | 2150389 C1 | 6/2000 |
| RU | 2212272 C1 | 9/2003 |
| RU | 2294239 C1 | 2/2007 |
| WO | 0187771 A1 | 11/2001 |
| WO | WO-02062466 A2 | 8/2002 |
| WO | 2006051338 A2 | 5/2006 |
| WO | 2006051338 A3 | 5/2006 |
| WO | WO-2018065271 A1 | 4/2018 |
| WO | 2018151733 A1 | 8/2018 |

OTHER PUBLICATIONS

"International Search Report issued in PCT/EP2020/050373 on Mar. 6, 2020".

\* cited by examiner

CATALYST SYSTEM AND METHOD FOR THE CATALYTIC COMBUSTION OF AMMONIA TO FORM NITROGEN OXIDES IN A MEDIUM-PRESSURE SYSTEM

CROSS REFERENCE TO RELATED APPLICATIONS

This application is a national stage of International Patent Application No. PCT/EP2020/050377, filed Jan. 9, 2020, which the claims the benefit of European Application No. EP 19151608.7, filed Jan. 14, 2019, the entire contents of which are incorporated by reference herein.

FIELD OF THE INVENTION

The present invention relates to a catalyst system for the catalytic combustion of ammonia to form nitrogen oxides in a medium-pressure plant, having a plurality of catalyst gauze layers weft-knitted, woven or warp-knitted from platinum-based noble metal wire, which, when arranged one behind the other in a fresh gas flow direction, form a catalyst pack.

In addition, the invention relates to a process for the catalytic combustion of ammonia to form nitrogen oxides in a medium-pressure plant by passing a fresh gas that contains ammonia and oxygen through a catalyst system, whereby ammonia is burned.

Nitric acid is produced on an industrial scale for the chemical industry and for fertiliser production by the heterogeneous noble metal catalysed oxidation of ammonia with oxygen to form nitrogen oxide according to the Ostwald process.

BACKGROUND OF THE INVENTION

The catalyst systems employed for this purpose are installed in the reaction zone of a flow reactor in a plane perpendicular to the flow direction of the fresh gas, with a plurality of catalyst gauzes often being arranged one behind the other and combined to form a so-called catalyst pack. The catalyst gauzes consist of single- or multilayer weft-knitted, warp-knitted or woven fabrics made of fine noble metal wires. The noble metal wires consist predominantly of platinum (Pt), palladium (Pd), rhodium (Rh) or alloys of these metals.

Ammonia oxidation can take place at low pressure (1-3 bar; PtRh10), medium pressure (3.5-7 bar; PtRh5) or at high pressure (8-14 bar, PtRh3). The binary PtRh alloy typically used for each pressure range is given in brackets, with numbers indicating the rhodium content as a percentage by weight.

When ammonia is burned with oxygen, dinitrogen monoxide ($N_2O$) is obtained as an undesirable by-product, which damages the ozone layer and constitutes a greenhouse gas. It is therefore important to avoid the formation of $N_2O$ as far as possible in the combustion reaction without negatively affecting the yield of desirable nitrogen oxides.

In nitric acid plants, depending on their design, between 2 and 30 catalyst gauzes of up to 6 m diameter are used. Noble metal use represents a high, fixed investment and is kept as low as possible. On the other hand, the "catalytic efficiency", which is an important parameter and a measure of consistently high starting material conversions and good yield, depends on the noble metal content.

During the ammonia oxidation process, the catalyst gauzes continuously lose noble metal as a result of oxidation and sublimation, so that from time to time (service life, operating life) they have to be replaced, at some expense. PtRh5 alloy has proved to be a suitable compromise with regard to operating life, catalytic efficiency and noble metal use, and has become widely accepted as the industrial standard for noble metal catalysts for use in medium-pressure plants.

To reduce noble metal use while maintaining catalytic efficiency, DE 101 05 624 A1 proposes a flow reactor for the catalytic oxidation of ammonia in a medium-pressure process, in which three-dimensional knitted catalyst gauzes are used, in which the individual mesh layers are connected to each other by pile threads. Mesh and pile threads consist of the same material, e.g. PtRh5 or PtRh8.

In the exemplary embodiment, a test reactor with a catalyst pack made of PtRh5 wire is employed, which is composed of an assembly of two front single-layer knitted catalyst gauzes with a weight per unit area of 600 $g/m^2$, a middle assembly of three two-layer knitted catalyst gauzes with a comparatively higher weight per unit area of 900 $g/m^2$ per catalyst gauze layer, and finally a two-layer knitted catalyst gauze interspersed with weft threads with a weight per unit area of 800 $g/m^2$ per catalyst gauze layer. The total installed weight of noble metal is 16.5 kg and is therefore 4 kg lower than in a reference reactor with comparable catalytic efficiency.

DE 602 01 502 T2 describes three-dimensional catalyst gauzes for carrying out heterogeneously catalysed gas reactions for the oxidation of ammonia with atmospheric oxygen to produce nitric acid and for reacting ammonia with methane in the presence of oxygen to produce hydrocyanic acid. The catalyst gauzes are made up of a plurality of mesh layers of knitted noble metal wires, wherein weft threads of noble metal wire are inserted between the mesh layers.

From WO 2018/065271 A1, a wire for weaving or knitting a catalyst gauze is known, which consists of two to eight intertwined individual filaments and contains at least 90 wt. % Pt and at least 5 wt. % Rh.

EP 2 689 841 A2 describes a catalyst composed of a plurality of catalyst gauzes made of a first noble-metal-containing wire arranged one behind the other, into each of which a second noble-metal-containing wire is embedded, giving the catalyst gauze a preferential direction. The catalyst gauzes are arranged one behind the other in such a way that the preferential directions of adjacent catalyst gauzes form an angle of between 45° and 135°, wherein an intermediate gauze made of a third noble-metal-containing wire is inserted between adjacent catalyst gauzes.

BRIEF SUMMARY OF THE DISCLOSURE

The invention described in DE 101 05 624 A1 still requires high noble metal use.

The invention is based on the object of providing a catalyst system for use in a medium-pressure plant for ammonia oxidation, with which, despite reduced noble metal use, a yield of the main product NO can be achieved that is comparable with the industrial standard.

In addition, the invention is based on the object of specifying a process for ammonia oxidation in a medium-pressure plant, by means of which a comparatively high product yield is achievable with low noble metal use.

DETAILED DESCRIPTION

Figure 1:
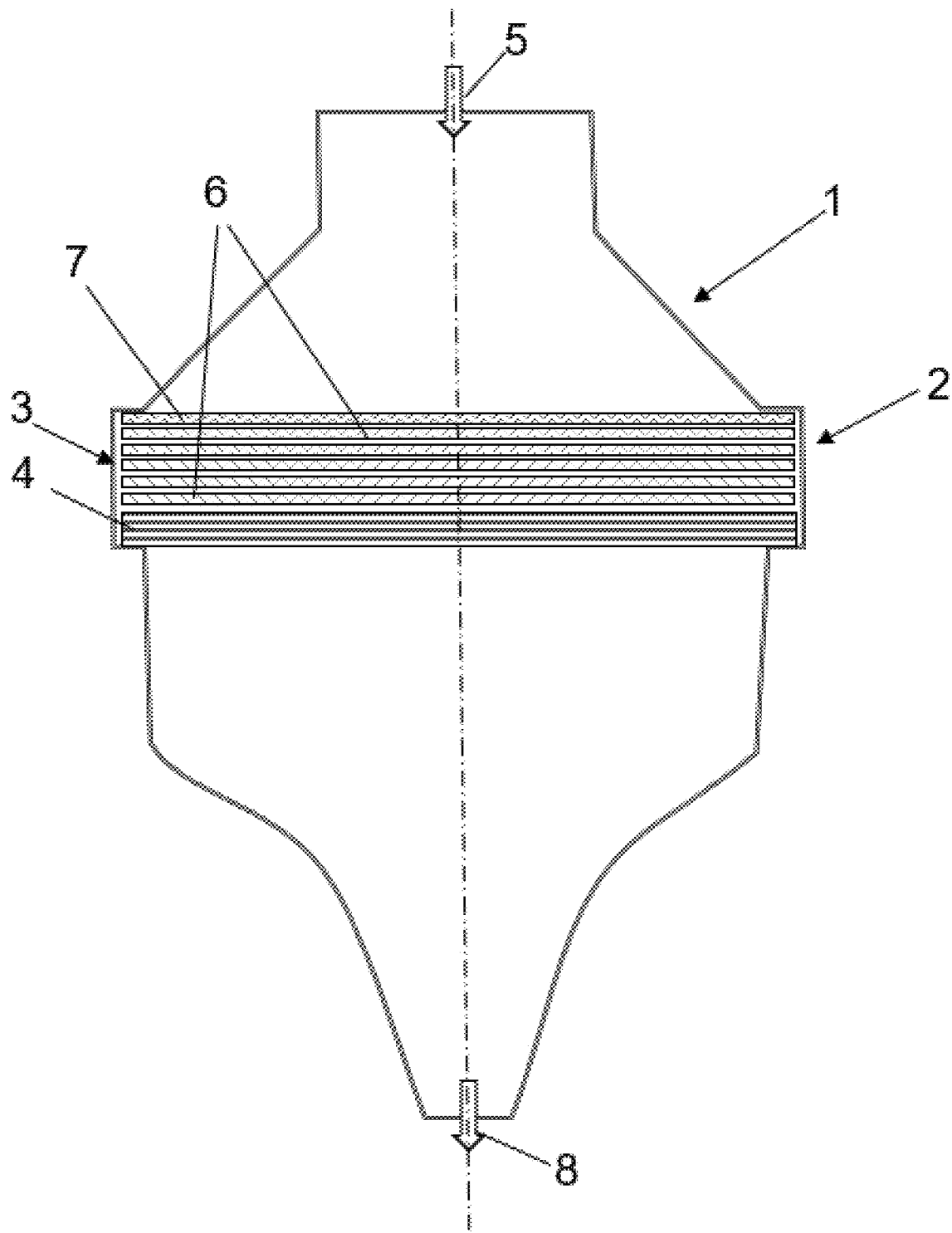
FIG. 1 is a schematic diagram of a flow reactor for the heterogeneous catalytic combustion of ammonia.

With regard to the catalyst system, this object is achieved according to the invention, starting from a catalyst system of the type mentioned above, by the fact that the catalyst pack is formed from a front assembly with three catalyst gauzes having a first average weight per unit area, and a downstream assembly of catalyst gauze layers arranged behind the front assembly having a second average weight per unit area, wherein the average weight per unit area of the front assembly has a weight reduction ranging from 1.5% to 29% relative to the second average weight per unit area, and that the first average weight per unit area is in the range of 410 to 530 $g/m^2$ and the second average weight per unit area is in the range of 540 to 790 $g/m^2$.

The catalyst system comprises a catalyst pack, which is composed of catalyst gauze layers of the front and downstream catalyst gauze layer assemblies as well as any getter gauzes, which will not be considered in detail here. The catalyst gauze layers of the catalyst pack are formed by single- or multilayer catalyst gauzes made of platinum-based noble metal wires. Unless otherwise specified, the term "catalyst gauze" will also be used below as an equivalent to "catalyst gauze layer" in the sense of a single-layer catalyst gauze.

In the front assembly, the first three catalyst gauze layers in the fresh gas flow direction are grouped together. The front assembly borders the downstream assembly, which likewise comprises a plurality of catalyst gauze layers. Before being used for their intended purpose, the catalyst gauze layers have an initial nominal weight per unit area which is prescribed e.g. in a specification or other stipulation. The catalyst gauze layers of an assembly can have the same nominal weight per unit area or can differ from each other in this respect. It is the average weight per unit area of the assembly that is being considered here, defined as the quotient of the sum of the nominal (initial) weights per unit area and the number of catalyst gauzes of the particular assembly. The single- or multilayer catalyst gauzes consist of platinum-based noble metal wire with a diameter d. The weight per unit area of a catalyst gauze layer depends inter alia on the diameter of the relevant noble metal wire. The greater the wire diameter, the higher the weight per unit area for a given mesh size. Typical noble metal wire diameters are in the range of 40 to 120 μm; a standard wire diameter in catalyst gauzes for medium-pressure plants is 76 μm. The average weight per unit area of the front assembly is in the range of 410 to 530 $g/m^2$, and the average weight per unit area of the catalyst gauzes of the downstream assembly is in the range of 540 to 790 $g/m^2$.

As a result of the lower average weight per unit area of the front assembly, a lower packing density is obtained in the front longitudinal portion of the catalyst pack compared with the downstream assembly, and this is associated with a significantly lower noble metal use in the catalyst gauze layers of the front assembly. In itself, it would be expected that the saving in noble metal would also be accompanied by a marked decrease in the catalytic efficiency of the catalyst system. However, it has surprisingly been found that the catalytic efficiency can be largely maintained—within the limits of a measuring accuracy of approximately 0.3% (absolute)—if at the same time the difference between first average weight per unit area and second average weight per unit area is kept low, and is specifically in the range of 1.5% to 29%, and preferably no more than 25%, relative to the second average weight per unit area.

In order to largely maintain the catalytic efficiency, as desired, a comparatively narrow range of the average weights per unit area of the catalyst gauze layers of the first and second assemblies is required, as indicated above. An embodiment of the catalyst system in which the first average weight per unit area is in the range of 415 to 510 $g/m^2$ and the second average weight per unit area is in the range of 575 to 710 $g/m^2$ has proved particularly expedient. The differences in weight per unit area can be based on the wire gauge of the noble metal wire. However, it has proved particularly expedient if the catalyst gauze layers of the front and downstream assemblies are made from a noble metal wire with the same or approximately the same wire gauge, and if the difference in weight per unit area is substantially due to different warp-knit, weft-knit or weave patterns of the catalyst gauzes. Accordingly, the catalyst gauze layers of the front assembly consist of a warp-knitted fabric with a first warp-knit pattern and a first mesh size, or of a woven fabric with a first weave pattern and a first mesh size, or of a weft-knitted fabric with a first weft-knit pattern and a first mesh size, and the catalyst gauze layers of the downstream assembly consist of a warp-knitted fabric with a second warp-knit pattern and a second mesh size, or of a woven fabric with a second weave pattern and a second mesh size, or of a weft-knitted fabric with a second weft-knit pattern and a second mesh size, wherein the first mesh size is greater than the second mesh size.

The difference in weight per unit area is therefore not based, or not exclusively based, on differences in the wire gauges, but substantially on different warp-knit, weft-knit or weave patterns of the catalyst gauzes, and specifically on the mesh sizes. The mesh size of the catalyst gauze layers of the front assembly thus results in an average weight per unit area substantially no more than 29% lower, preferably no more than 25% lower, than that of the catalyst gauze layers of the downstream assembly. The catalyst gauze layers of the downstream assembly are in the form of e.g. standard catalyst gauzes for medium-pressure operation with a wire diameter of 76 μm and a weight per unit area of 600 $g/m^2$.

The comparatively more open configuration of the meshes in the catalyst gauze layers of the front assembly can also contribute to improved utilisation of the flow occurring in the catalyst pack, and thus to higher selectivity of the catalyst system. This is because the reaction usually takes place in the gauze pack in the front (top) gauze layers, and therefore these are subject to particularly severe thermal and mechanical loads. A more open configuration of the meshes in this region allows the load to be distributed from the upper gauze layers to gauze layers further down, so that despite the lower noble metal use, the efficiency of the catalyst system is not significantly decreased.

The lower the individual weight per unit area of a single catalyst gauze layer, the greater the saving of noble metal. On the other hand, the catalytic efficiency of the catalyst system can decline with low average weights per unit area. It is therefore provided in a preferred embodiment of the catalyst system that the individual weight per unit area of the catalyst gauze layers of the front assembly is constant or increases in the order in the fresh gas flow direction.

The catalyst system can contain catalyst gauzes composed of noble metal wire based on other noble metals, such as palladium or iridium, or noble metal wire composed of an alloy that contains another noble metal or a plurality of other noble metals apart from platinum and rhodium. In the simplest and preferred case, the catalyst gauze layers of the front and downstream assemblies consist only of platinum and rhodium.

In a further advantageous embodiment of the catalyst system, the catalyst gauze layers comprise a front group of gauze layers with a gauze layer or with a plurality of gauze layers made of a first, rhodium-rich, noble metal wire, and a downstream group of gauze layers made of a second, rhodium-poor, noble metal wire, arranged after the front group, wherein the gauze layer or one of the gauze layers made of the rhodium-rich noble metal wire forms a front gauze layer facing the fresh gas, and wherein the rhodium content in the rhodium-rich noble metal wire is at least 7 wt. % and no more than 9 wt. % and is at least 1 percentage point higher than the rhodium content in the rhodium-poor noble metal wire.

In this embodiment, the plurality of catalyst gauze layers of platinum-based single- or multilayer catalyst gauzes are divided into at least two groups. The front group contains at least one catalyst gauze layer. The downstream group generally represents the greatest proportion by volume and weight of the catalyst system and comprises a plurality of catalyst gauze layers.

The reduced-weight catalyst gauze layers of the front assembly with the first, lower, average weight per unit area can at the same time form the gauze layers of the front group composed of the rhodium-rich alloy; generally—and preferably-however, these modules of the catalyst pack are different. In other words: the "front group of catalyst gauze layers" and the "front assembly of catalyst gauze layers" do not have to be congruent, and likewise the "downstream group of catalyst gauze layers" does not have to coincide with the "downstream assembly of catalyst gauze layers".

The downstream group generally represents the greatest proportion by volume and weight of the catalyst system and comprises a plurality of catalyst gauze layers. The front group and the downstream group can be separated from each other by catalyst gauzes with a different composition. In the preferred case, however, they are immediately adjacent to one another. In the simplest case, the front group contains the front catalyst gauze layer in the fresh gas flow direction. The catalyst gauzes of the two groups consist of warp-knitted, weft-knitted or woven noble metal wires, which differ in their chemical composition. In the noble metal wire of the catalyst gauze layer(s) of the front group, the rhodium content is at least 7 wt. % and no more than 9 wt. %, and it is at least 1 percentage point higher than the rhodium proportion by weight in the noble metal wire of the catalyst gauze layers of the downstream group; the rhodium proportion by weight of these is accordingly no more than 6%.

The rhodium content in the rhodium-rich noble metal wire of the front group, with a value of at least 7 wt. %, is higher than in the standard for industrial nitric acid plants for medium-pressure operation, which has been optimised for efficiency, operating life and N₂O avoidance, in which it is 5 wt. %. It is therefore surprising that a higher catalytic efficiency is achievable by using the rhodium-rich noble metal wire without this having any negative effects on operating life and N₂O formation. However, this result is not achieved if all the subsequent catalyst gauze layers in the flow direction of the fresh gas likewise consist of a rhodium-rich noble metal wire, but only if the rhodium content decreases in the flow direction of the fresh gas, and the catalyst gauze layers of the downstream group consist of rhodium-poor noble metal wire, with the rhodium proportion by weight being no more than 6 wt. % here, and preferably in the range of the industrial standard value of 5 wt. %.

With the use of alloys having a rhodium content lower than 7 wt. % in the rhodium-rich noble metal wire, a small increase in catalytic efficiency is achieved. With a rhodium content higher than 9 wt. %, if pressure conditions and temperatures are unfavourable, rhodium oxides can form which cause a gradual decline in catalytic efficiency over the operating life of the catalyst system.

In general, the majority of the total weight of the catalyst gauzes of the catalyst system, e.g. at least 70%, is made up of catalyst gauze layers composed of the rhodium-poor noble metal wire, and it is sufficient if only a small proportion by weight, e.g. less than 30%, preferably less than 25%, and particularly preferably less than 20%, is made up of gauze layers of the front group composed of the rhodium-rich noble metal wire. It has proved expedient if, for example, the front group comprises no more than three gauze layers.

With regard to a high catalytic efficiency together with minor or no negative effects on operating life and N₂O formation, it has proved expedient if the rhodium content in the rhodium-poor noble metal wire is in the range of 4 to 6 wt. %, and in particular if the rhodium content in the rhodium-rich noble metal wire is in the range of 7.8 to 8.2 wt. % and the rhodium content in the rhodium-poor noble metal wire is in the range of 4.8 to 5.2 wt. %.

The front group of gauze layers has a front gauze layer facing the fresh gas, which consists of the rhodium-rich noble metal wire. This front gauze layer can be part of a multilayer catalyst gauze, for example, or the front gauze layer is formed as a single layer of a single-layer catalyst gauze. It has surprisingly been shown that, to increase catalytic efficiency, it is sufficient if the front gauze layer alone forms the front group of gauze layers. This represents a particularly simple and therefore preferred embodiment of the catalyst system.

It has also proved advantageous in this regard if the front gauze layer—e.g. as a single layer or as a multiple layer of a multilayer catalyst gauze—lies on the gauze layers of the downstream group. In this case, the flow reactor containing the catalyst pack is in a vertical position and the flow direction is directed vertically from top to bottom.

Friction and weight force are sufficient to fix the front gauze layer on the catalyst pack. This simplifies the production of the catalyst system and the retrofitting of existing catalyst systems to form a catalyst system according to the present invention.

With regard to the process, the above-mentioned technical object is achieved, starting from a process of the type mentioned above, by passing the fresh gas with an ammonia content of between 9.5 and 12 vol. % through a catalyst system according to the present invention under a pressure in the range of between 3.5 and 7 bar, at a catalyst gauze temperature in the range of 870 to 920° C. and with a throughput in the range of 6 to 16 tN/m²d.

The abbreviation "tN/m²d" here stands for "tonnes of nitrogen (from ammonia) per day and effective cross-sectional area of the catalyst pack in square metres". The process is designed for operation in the medium-pressure range of between 3.5 and 7 bar. With an ammonia content of less than 9.5 vol. % in the fresh gas and a throughput of less than 6 tN/m²d, the combustion process can come to an unintended halt. An NH₃ content of more than 12 vol. % in the fresh gas is close to the safety threshold for an explosive mixture. At a catalyst gauze temperature of less than 870°

C., increasing formation of rhodium oxide can occur; and at a catalyst gauze temperature higher than 920° C., platinum oxide volatilisation occurs to a greater degree. The catalyst gauze temperature is influenced by the preheat temperature of the fresh gas, which is preferably in the range of 150 and 220° C.

Definitions

Noble Metal Wire

A noble-metal-containing wire is understood to be a wire consisting of noble metal or containing a significant proportion (>50 wt. %) of noble metal. A platinum-based alloy contains more than 50 wt. % platinum. Further alloying elements that should be mentioned are in particular palladium, rhodium and ruthenium. Typical noble metal wire diameters are in the range of 40 to 120 μm.

Medium-Pressure Plants

In medium-pressure plants, ammonia oxidation takes place under a pressure in the range of 3.5 to 7 bar. For this pressure range, noble metal catalysts made of noble metal wire composed of a binary PtRh5 alloy with a diameter of 76 μm and a weight per unit area of approximately 600 g/m² have become established as standard.

Catalyst Gauze

A single-layer or multilayer textile fabric produced by weaving, warp-knitting or weft-knitting a noble metal wire or a plurality of noble metal wires. The textile production is achieved by interlacing one or more thread systems or wire systems in a mesh-like manner.

Catalyst System

The catalyst system comprises a catalyst pack and generally a getter gauze or a plurality of getter gauzes, which have likewise been produced by weft-knitting, weaving or warp-knitting noble metal wire.

Catalyst Pack

An arrangement of a plurality of catalyst gauzes one behind the other in the flow direction of the fresh gas.

Exemplary Embodiment

Figure 2:
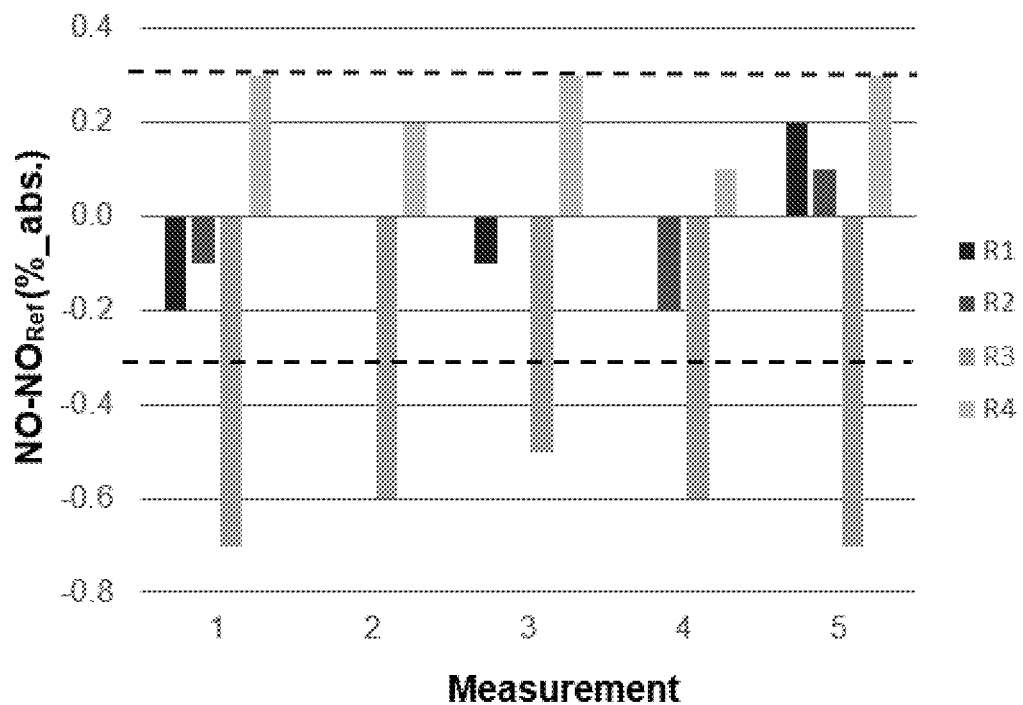
FIG. 2 is a bar chart with results for the catalytic efficiency of test reactors compared with a reference reactor.
Figure 3:
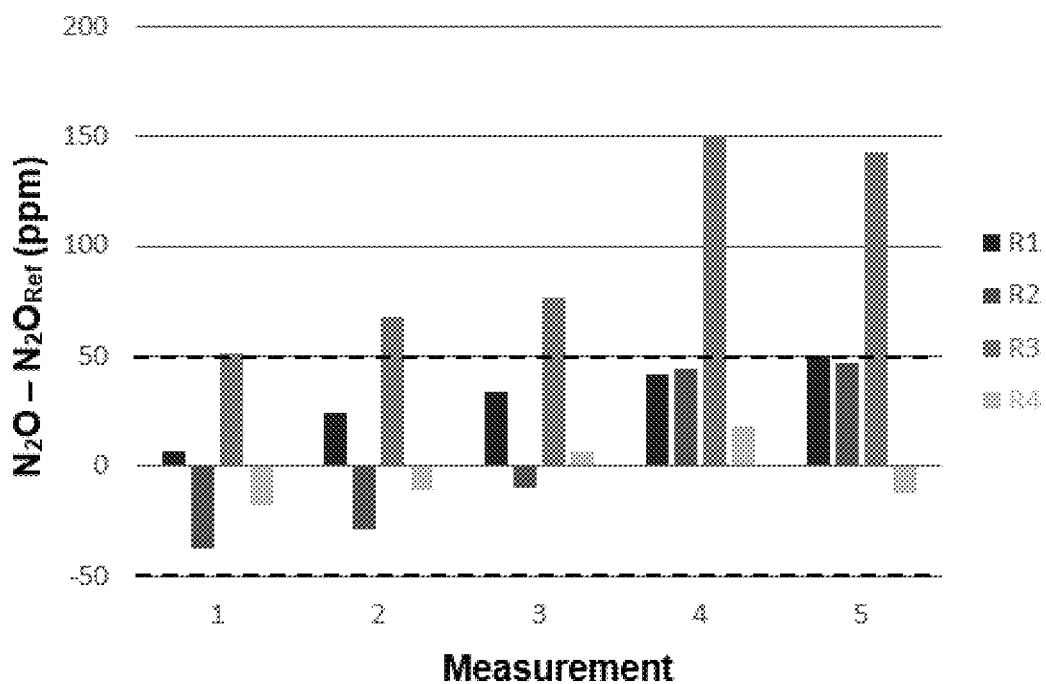
FIG. 3 is a bar chart with results for the $N_2O$ formation of the test reactors compared with the reference reactor.

The invention will be explained below with the aid of exemplary embodiments and a drawing. The figures show the following:

FIG. 1 a flow reactor for the heterogeneous catalytic combustion of ammonia in a schematic diagram, FIG. 2 a bar chart with results for the catalytic efficiency of test reactors compared with a reference reactor, and FIG. 3 a bar chart with results for the N₂O formation of the test reactors compared with the reference reactor.

FIG. 1 is a schematic view of a vertically positioned flow reactor 1 for the heterogeneous catalytic combustion of ammonia. The catalyst system 2 forms the actual reaction zone of the flow reactor 1. It comprises a catalyst pack 3 and downstream getter gauzes 4. The catalyst pack 3 comprises a plurality of single-layer catalyst gauzes 6, arranged one behind the other in the flow direction 5 of the fresh gas, on which a further catalyst gauze 7 (or a plurality of catalyst gauze layers) can be laid, which is optionally part of the catalyst pack. Embodiments are specified in more detail in Tables 1 to 5. The effective catalyst gauze diameter is 100 mm.

The fresh gas is an ammonia-air mixture with a nominal ammonia content of 10.7 vol. %. It is heated to a preheat temperature of 175° C. and fed into the reactor 1 from the top under an elevated pressure of 5 bar. When it enters the catalyst pack 3, an ignition of the gas mixture occurs followed by an exothermic combustion reaction, which covers the entire catalyst pack 3. The following primary reaction takes place here:

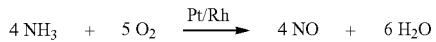

$$4\,NH_3 + 5\,O_2 \xrightarrow{Pt/Rh} 4\,NO + 6\,H_2O$$

Ammonia ($NH_3$) is converted to nitrogen monoxide (NO) and water ($H_2O$) in this reaction. The nitrogen monoxide (NO) that is formed reacts with excess oxygen in the downward-flowing reaction gas mixture (symbolised by the directional arrow 8 showing the flow direction of the reaction gas mixture) to form nitrogen dioxide ($NO_2$), which is reacted with water to form nitric acid ($HNO_3$) in a downstream absorption plant.

The catalyst gauzes 6, 7 are each textile fabrics produced by machine warp-knitting a noble metal wire with a diameter of 76 μm composed of binary platinum-rhodium alloys. In the flow reactor 1, the catalyst systems specified in Tables 1 to 5 were tested.

In most of the test reactors, the catalyst pack comprises five single-layer catalyst gauzes 6; in one test reactor the catalyst pack comprises an additional catalyst gauze 7 laid on top. The catalyst gauzes were produced by warp-knitting a noble metal wire composed of a binary PtRh alloy. The sequence in which items are named in Tables 1 to 5 reflects the arrangement in the flow direction of the fresh gas. In addition, getter gauzes 4 are provided in all the reactors, consisting of six active catchment gauze layers ("getter gauzes") composed of Pd82.5Pt15Rh2.5. The test reactors differ from each other in the composition of the front (top) catalyst gauze layer 7 and/or in the weight per unit area of the catalyst gauze layers.

The reference reactor according to Table 1 represents a reactor according to the current industrial standard for medium-pressure plants. The single-layer catalyst gauzes are produced from a noble metal wire with a wire diameter of 76 μm. The weight per unit area of each of the PtRh5 catalyst gauzes used is 600 g/m², as stated in the "Wt. per unit area per layer" column. The sum of the weights per unit area of all the layers L1 to L5 of the catalyst pack is therefore 3000 g/m².

TABLE 1

| Reference reactor | | |
| --- | --- | --- |
| Gauze layer | Noble metal | Wt. per unit area per layer [g/m²] |
| L1 | PtRh5 | 600 |
| L2 | PtRh5 | 600 |
| L3 | PtRh5 | 600 |
| L4 | PtRh5 | 600 |
| L5 | PtRh5 | 600 |
| | | Σ: 3000 |

In the following Tables 2 to 5, data relating to test reactors R1 to R4 are given. In the "Assembly allocation" column, the number "1" means that the respective catalyst gauze layer is allocated to the front assembly (also referred to below as "assembly 1"), and the number "2" shows that the respective catalyst gauze layer(s) is/are allocated to the downstream assembly (also referred to below as "assembly 2"). In all the test reactors R1 to R4, the catalyst gauze layers L1 to L3 are to be allocated to the "front assembly" within the meaning of the invention; this is additionally marked by grey shading.

In the "Av. wt. per unit area per assembly" column (in g/m²), the quotient of the sum of the individual weights per unit area of the catalyst gauzes and the number of catalyst gauzes in the respective assemblies is given, referred to here for short as the "average weight per unit area". The weights per unit area are nominal, initial weights per unit area, as can be achieved as standard with a noble metal wire having a wire diameter of 76 μm.

The last column of the tables gives the difference between the average weight per unit area of assembly 1 and an average weight per unit area of assembly 2 in % (the percentage figure is based here on the second average weight per unit area). This percentage figure thus represents the noble metal saving of the respective test reactors in comparison with a reactor in which the catalyst pack consists completely of catalyst gauze layers with the second weight per unit area.

TABLE 2

Test reactor R1

| Gauze layer | Noble metal | Assembly allocation | Wt. per unit area per layer [g/m²] | Av. wt. per unit area per assembly [g/m²] | Δ Wt. per unit area [%] |
|---|---|---|---|---|---|
| L1 | PtRh5 | 1 | 421 | | |
| L2 | PtRh5 | 1 | 421 | | |
| L3 | PtRh5 | 1 | 600 | 481 | 20 |
| L4 | PtRh5 | 2 | 600 | | |
| L5 | PtRh5 | 2 | 600 | 600 | |

Σ: 2642

In the test reactor R1, the average weight per unit area of the front assembly is 481 g/m², which is approximately 20% less than the average weight per unit area of 600 g/m² of the layers L4 and L5, which represent a "downstream assembly" of the catalyst pack.

TABLE 3

Test reactor R2

| Gauze layer | Noble metal | Assembly allocation | Wt. per unit area per layer [g/m²] | Av. wt. per unit area per assembly [g/m²] | Δ Wt. per unit area [%] |
|---|---|---|---|---|---|
| L1 | PtRh5 | 1 | 421 | | |
| L2 | PtRh5 | 1 | 540 | | |
| L3 | PtRh5 | 1 | 540 | 500 | 7 |
| L4 | PtRh5 | 2 | 540 | | |
| L5 | PtRh5 | 2 | 540 | 540 | |

Σ: 2581

In the test reactor R2, the assembly 1 is likewise formed by the top catalyst gauze layers L1 to L3. Their nominal, initial average weight per unit area is 500 g/m²; this is approximately 7% less than the average weight per unit area of assembly 2, which is 540 g/m².

TABLE 4

Test reactor R3

| Gauze layer | Noble metal | Assembly allocation | Wt. per unit area per layer [g/m²] | Av. wt. per unit area per assembly [g/m²] | Δ Wt. per unit area [%] |
|---|---|---|---|---|---|
| L1 | PtRh5 | 1 | 421 | | |
| L2 | PtRh5 | 1 | 421 | | |
| L3 | PtRh5 | 1 | 421 | 451 | 30 |
| L4 | PtRh5 | 2 | 600 | | |
| L5 | PtRh5 | 2 | 600 | 600 | |

Σ: 2463

In the test reactor R3, the front assembly (1) is again formed by the catalyst gauze layers L1 to L3. Their weight per unit area is 421 g/m² each, which is approximately 30% less than the standard weight per unit area of 600 g/m² (for a noble metal wire diameter of 76 μm).

TABLE 5

Test reactor R4

| Gauze layer | Noble metal | Assembly allocation | Wt. per unit area per layer [g/m²] | Av. wt. per unit area per assembly [g/m²] | Δ Wt. per unit area [%] |
|---|---|---|---|---|---|
| L1 | PtRh8 | 1 | 600 | | |
| L2 | PtRh5 | 1 | 421 | | |
| L3 | PtRh5 | 1 | 421 | 481 | 20 |
| L4 | PtRh5 | 2 | 600 | | |
| L5 | PtRh5 | 2 | 600 | | |
| L6 | PtRh5 | 2 | 600 | 600 | |

Σ: 3242

In the test reactor R4, the top catalyst gauze layer L1 consists of a PtRh8 alloy and it has a weight per unit area of 600 g/m². The two immediately following catalyst gauzes consist of a PtRh5 alloy and have a warp-knit pattern that leads to a comparatively lower weight per unit area of 421 g/m². These three layers form the assembly 1. The last three catalyst gauze layers L4 to L6 of the catalyst pack form the assembly 2 and likewise consist of PtRh5 alloy with a weight per unit area of 600 g/m².

The front assembly is again formed by the catalyst gauze layers L1 to L3 here. Their average weight per unit area (481 g/m²) is approximately 20% lower than the average weight per unit area of the assembly 2—i.e. of the layers L4 to L6.

The front layer L1 is laid on the remainder of the catalyst pack (reference numeral 2 in FIG. 1). It forms the front catalyst gauze in the flow direction 5 (reference numeral 7 in FIG. 1), composed of a rhodium-rich noble metal wire, and therefore a "front group of catalyst gauze layers" within the meaning of a preferred embodiment of the invention. The remaining catalyst gauze layers here, L2 to L6, composed of the comparatively rhodium-poor noble metal wire, form a "downstream group of catalyst gauze layers" within the meaning of this embodiment of the invention.

The test reactors were operated under the following test conditions, which were identical in each case.
  Pressure: 5 bar (absolute)
  Throughput: 12 tonnes nitrogen (from ammonia) per day and effective cross-sectional area of the catalyst pack in square metres (abbreviated as 12 tN/m²d)

NH₃ content: 10.7 vol. % in the fresh gas
Preheat temp: 175° C. (temperature of the $NH_3$/air mixture), giving a gauze temperature of 890° C. in the test reactors.

At intervals of approximately 24 h, the NO yield and the proportion of $N_2O$ forming as a by-product were measured to determine changes in catalytic efficiency. Five test results were obtained for each of the test reactors R1 to R4.

The procedure for measuring the catalytic efficiency (i.e. the NO product yield) was as follows:

1. It was first ensured that the catalyst system was suitable for the complete conversion of the ammonia being used and that $NH_3$ was no longer present in the product gas in a significant quantity. This was verified by mass spectrometry measurement of the product gas.
2. A sample of $NH_3$/air was taken upstream of the catalyst pack at the same time as a sample of the product gas was taken downstream in separately evacuated flasks. The mass of the gas was determined by weighing.
3. The $NH_3$/air mixture was absorbed in distilled water and titrated to colour change using 0.1N sulfuric acid and methyl red.
4. The nitrous product gases were absorbed in 3% sodium peroxide solution and titrated to colour change using 0.1N sodium hydroxide solution and methyl red.
5. The catalytic efficiency eta was obtained from: eta=100×Cn/Ca, wherein Ca is the average $NH_3$ concentration from 7 individual measurements in the fresh gas as a percentage by weight, and Cn is the average NOx concentration from 7 individual measurements, expressed as a percentage by weight of $NH_3$ that has been oxidised to form NOx.
6. Separately, the proportion by volume of $N_2O$ in the product gas was determined by gas chromatography.

The test results are compiled in Table 6. In the columns labelled "NO—$NO_{Ref}$" in Table 6, the yield difference of nitrogen monoxide is given in absolute percentage points compared with the reference reactor (e.g. measurement no. 1 in reactor R1 gives an NO yield of 95.2%, and therefore a difference NO—$NO_{Ref}$ of −0.2 percentage points compared with the measured value of 95.4% in the reference reactor). In the columns labelled "$N_2O$—$N_2O_{Ref}$", the difference in dinitrogen monoxide is given compared with the reference reactor in each case in parts per million by volume (vol. ppm).

TABLE 6

| | Reference reactor | | Reactor 1 | | Reactor 2 | | Reactor 3 | | Reactor 4 | |
|---|---|---|---|---|---|---|---|---|---|---|
| | Yield | | | | | | | | | |
| No. | NO vol.-% | $N_2O$ vol.-ppm | NO—$NO_{Ref}$ [%_abs] | $N_2O$—$N_2O_{Ref}$ [ppm] | NO—$NO_{Ref}$ [%_abs] | $N_2O$—$N_2O_{Ref}$ [ppm] | NO—$NO_{Ref}$ [%_abs] | $N_2O$—$N_2O_{Ref}$ [ppm] | NO—$NO_{Ref}$ [%_abs] | $N_2O$—$N_2O_{Ref}$ [ppm] |
| 1 | 95.4 | 868 | −0.2 | 7 | | | | | | |
| 2 | 95.3 | 835 | 0.0 | 24 | | | | | | |
| 3 | 95.2 | 745 | −0.1 | 34 | | | | | | |
| 4 | 95.0 | 895 | 0.0 | 42 | | | | | | |
| 5 | 95.1 | 886 | 0.2 | 50 | | | | | | |
| 1 | 95.4 | 845 | | | −0.1 | −38 | | | | |
| 2 | 95.3 | 800 | | | 0 | −29 | | | | |
| 3 | 95.2 | 730 | | | 0 | −10 | | | | |
| 4 | 95.2 | 802 | | | −0.2 | 44 | | | | |
| 5 | 95.1 | 807 | | | 0.1 | 47 | | | | |
| 1 | 95.4 | 845 | | | | | −0.7 | 51 | | |
| 2 | 95.3 | 729 | | | | | −0.6 | 68 | | |
| 3 | 95.2 | 730 | | | | | −0.5 | 77 | | |
| 4 | 95.1 | 807 | | | | | −0.6 | 151 | | |
| 5 | 95.2 | 843 | | | | | −0.7 | 143 | | |
| 1 | 95.2 | 870 | | | | | | | 0.3 | −18 |
| 2 | 95.3 | 834 | | | | | | | 0.2 | −11 |
| 3 | 95.3 | 867 | | | | | | | 0.3 | 7 |
| 4 | 95.4 | 899 | | | | | | | 0.1 | 18 |
| 5 | 95.2 | 945 | | | | | | | 0.3 | −12 |

Test Results

The test results from Table 6 are illustrated graphically in the diagrams of FIGS. 2 and 3, and will be explained in more detail below with reference to these figures.

The diagram of FIG. 2 shows a measure of the catalytic efficiency for a nitrogen throughput of 12 tN/m²d for each of the reactors R1 to R4. On the y-axis, the difference in the nitrogen monoxide yield compared with the reference reactor "NO—NO$_{Ref}$" is entered in absolute percentage points (% _abs.). On the x-axis, the numerals 1 to 5 indicate the sequential number of each measurement.

According to the diagram, an efficiency in conversion to NO is obtained in both the reactors R1 and R2 which is comparable with the yield of the industrial standard according to the reference reactor within the limits of measurement error. The measurement error is approximately +/−0.3 percentage points, as marked by the broken line.

In the reactor R3, however, the yield of the main product NO is not comparable with the industrial standard. This is attributed to the large difference of 30% between the catalyst gauze layers of the front assembly with the catalyst gauze layers L1 to L3 and the downstream assembly with the catalyst gauze layers L4 and L5. The reactor R3 thus represents a comparative example for the invention.

In the reactor R4, despite the lower noble metal use, a catalytic efficiency is obtained which is comparable with the yield in the reference reactor within the limits of measurement error. The measurement error is approximately +/−0.3 percentage points, as marked by the broken line. However, since the first layer has a higher weight per unit area than the lower layers of the first assembly, no significant gain in efficiency as in reactor 1 is visible.

The diagram of FIG. 3 shows the test results for N$_2$O formation in the test reactors R1 to R4. On the y-axis, the difference in the quantity of dinitrogen monoxide in the product gas (N$_2$O-N$_2$O$_{Ref}$) by comparison with the reference reactor is entered in vol. ppm. On the x-axis, the numerals 1 to 5 again represent the sequential number of each measurement.

Accordingly, in the test reactors R1, R2 and R4 a quantity of N$_2$O in the range of the reference reactor is obtained. The standard measurement error is approximately +/−50 vol. ppm and is again indicated by broken lines.

In the reactor R3, however, an increase in N$_2$O formation above measurement inaccuracy is obtained. Reactor R3 is therefore also unsuitable with regard to reducing N$_2$O formation.

The invention claimed is:

1. A catalyst system for the catalytic combustion of ammonia to form nitrogen oxides in a medium-pressure plant, having a plurality of catalyst gauze layers weft-knitted, woven or warp-knitted from platinum-based noble metal wire, which, when arranged one behind the other in a fresh gas flow direction, form a catalyst pack, wherein the catalyst pack is formed from a front assembly with three catalyst gauzes having a first average weight per unit area, and a downstream assembly of catalyst gauze layers arranged after the front assembly, having a second average weight per unit area, wherein the average weight per unit area of the front assembly has a weight reduction ranging from 1.5% to 29% relative to the second average weight per unit area, and in that the first average weight per unit area is in the range of 410 to 530 g/m² and the second average weight per unit area is in the range of 540 to 790 g/m².

2. The catalyst system of claim 1, wherein the weight reduction is no more than 25%.

3. The catalyst system of claim 1, wherein the first average weight per unit area is in the range of 415 to 510 g/m², and in that the second average weight per unit area is in the range of 575 to 710 g/m².

4. The catalyst system of claim 1, wherein the catalyst gauze layers of the front and downstream assemblies are made from a noble metal wire with the same wire gauge, and in that the catalyst gauze layers of the front assembly consist of a warp-knitted fabric with a first warp-knit pattern and a first mesh size, or of a woven fabric with a first weave pattern and a first mesh size, or of a weft-knitted fabric with a first weft-knit pattern and a first mesh size, and the catalyst gauze layers of the downstream assembly consist of a warp-knitted fabric with a second warp-knit pattern and a second mesh size, or of a woven fabric with a second weave pattern and a second mesh size, or of a weft-knitted fabric with a second weft-knit pattern and a second mesh size, wherein the first mesh size is greater than the second mesh size.

5. The catalyst system of claim 1, wherein the individual weight per unit area of the catalyst gauze layers of the front assembly is constant or increases in the order in the fresh gas flow direction.

6. The catalyst system of claim 1, wherein the catalyst gauze layers of the front and downstream assemblies consist of platinum and rhodium.

7. The catalyst system of claim 1, wherein the catalyst gauze layers comprise a front group of gauze layers with a gauze layer or with a plurality of gauze layers composed of a first, rhodium-rich, noble metal wire, and a downstream group of gauze layers arranged after the front group, composed of a second, rhodium-poor, noble metal wire, wherein the gauze layer or one of the gauze layers composed of the rhodium-rich noble metal wire forms a front gauze layer facing the fresh gas, and wherein the rhodium content in the rhodium-rich noble metal wire is at least 7 wt. % and no more than 9 wt. % and is at least 1 percentage point higher than the rhodium content in the rhodium-poor noble metal wire.

8. The catalyst system of claim 7, wherein the rhodium content in the rhodium-poor noble metal wire is in the range of 4 to 6 wt. %.

9. The catalyst system of claim 7, wherein the rhodium content in the rhodium-rich noble metal wire is in the range of 7.8 to 8.2 wt. % and the rhodium content in the rhodium-poor noble metal wire is in the range of 4.8 to 5.2 wt. %.

10. The catalyst system of claim 7, wherein the front group of gauze layers has a proportion by weight of less than 30% of the total weight of the catalyst pack.

11. The catalyst system of claim 7, wherein the front group comprises no more than three gauze layers.

12. The catalyst system of claim 7, wherein the front group of gauze layers is formed by the front gauze layer.

13. The catalyst system of claim 12, wherein the front gauze layer lies on the gauze layers of the downstream group.

14. The catalyst system of claim 7, wherein the front group of gauze layers has a proportion by weight of less than 25% of the total weight of the catalyst pack.

15. The catalyst system of claim 7, wherein the front group of gauze layers has a proportion by weight of less than 20% of the total weight of the catalyst pack.

16. A process for the catalytic combustion of ammonia to form nitrogen oxides in a medium-pressure plant by passing a fresh gas that contains ammonia and oxygen through a catalyst system, wherein ammonia is burned, wherein the fresh gas with an ammonia content of between 9.5 and 12 vol. % is passed through a catalyst system according to claim 1 under a pressure in the range of between 3.5 and 7 bar at a catalyst gauze temperature in the range of 870 to 920° C. and with a throughput in the range of 6 to 16 tN/m²d.

* * * * *